US009828903B2

(12) United States Patent
Danev et al.

(10) Patent No.: US 9,828,903 B2
(45) Date of Patent: Nov. 28, 2017

(54) AIR-GOVERNING DEVICE FOR GOVERNING AN AIR FLOW INTO A VEHICLE

(71) Applicant: Dr. Ing. h.c. F. Porsche Aktiengesellschaft, Stuttgart (DE)

(72) Inventors: Dimitar Danev, Renningen (DE); Markus Paulitsch, Karlsruhe (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 174 days.

(21) Appl. No.: 14/870,048

(22) Filed: Sep. 30, 2015

(65) Prior Publication Data
US 2016/0102599 A1 Apr. 14, 2016

(30) Foreign Application Priority Data
Oct. 9, 2014 (DE) .................. 10 2014 114 639

(51) Int. Cl.
*F01P 7/10* (2006.01)
*B60K 11/08* (2006.01)

(52) U.S. Cl.
CPC .............. *F01P 7/10* (2013.01); *B60K 11/085* (2013.01); *B60Y 2306/01* (2013.01); *Y02T 10/88* (2013.01)

(58) Field of Classification Search
CPC .......... F01P 7/10; B60K 11/085; B60K 11/08; B60Y 2306/08
See application file for complete search history.

(56) References Cited

U.S. PATENT DOCUMENTS

| 2003/0029852 | A1 | 2/2003 | Ozawa et al. |
| 2010/0243352 | A1* | 9/2010 | Watanabe ............ B60K 11/085 180/68.1 |
| 2010/0282438 | A1 | 11/2010 | Wirth et al. |
| 2011/0048691 | A1 | 3/2011 | Shin et al. |
| 2013/0284401 | A1 | 10/2013 | Kiener et al. |

(Continued)

FOREIGN PATENT DOCUMENTS

| DE | 102 33 408 | 8/2003 |
| DE | 103 06 158 | 8/2004 |

(Continued)

OTHER PUBLICATIONS

German Search Report dated Jun. 22, 2015.

*Primary Examiner* — Lindsay Low
*Assistant Examiner* — Kevin A Lathers
(74) *Attorney, Agent, or Firm* — Gerald E. Hespos; Michael J. Porco; Matthew T. Hespos

(57) ABSTRACT

An air-governing device (10) for governing an air flow into a vehicle (100) has a main body (20) with an installation section (22) for fastening to a body of the vehicle (100) and an air opening (24). At least one slat (30) is mounted on the main body (20) for movement between a closed position (SP) closing the air opening (24) and an open position (OP) opening the air opening (24). A drive device (40) is fastened to the main body (20) and generates a moving force for the slat (30). A lever mechanism (50) forms an operative connection between the drive device (40) and the at least one slat (30). The lever mechanism (50) has at least one drive lever (52) operatively connected to the drive device (40) in a torque-transmitting manner and fastened in an end position (EP) of a keyhole opening (26) in the main body (20).

9 Claims, 7 Drawing Sheets

(56) References Cited

U.S. PATENT DOCUMENTS

2014/0045418 A1 2/2014 Schneider
2014/0308890 A1 10/2014 Schneider

FOREIGN PATENT DOCUMENTS

| DE | 10 2009 020 352 | 11/2010 |
| DE | 10 2009 044 648 | 3/2011 |
| DE | 10 2012 000 636 | 7/2013 |
| DE | 10 2012 208 560 | 11/2013 |
| DE | 10 2013 007 158 | 11/2013 |
| DE | 10 2012 012 677 | 12/2013 |
| DE | 10 2012 213 992 | 2/2014 |
| DE | 10 2013 206 410 | 10/2014 |

* cited by examiner

AIR-GOVERNING DEVICE FOR GOVERNING AN AIR FLOW INTO A VEHICLE

CROSS REFERENCE TO RELATED APPLICATION

This application claims priority under 35 USC 119 to German Patent Appl. No. 10 2014 114 639.5 filed on Oct. 9, 2014, the entire disclosure of which is incorporated herein by reference.

BACKGROUND

1. Field of the Invention

The invention relates to an air-governing device for governing an air flow into a vehicle.

2. Description of the Related Art

Air-governing devices are used, for example, to regulate or control an air flow that impinges on a cooling device for the engine of a vehicle. Such air-governing devices customarily are provided with slats that are movable between a closed position and an open position. Thus, the air flow can be controlled or regulated depending on a current operating situation, such as the external temperature around the vehicle and the engine temperature of the internal combustion engine of the vehicle. A drive device, such as an electric motor, customarily is provided to move the slats between the open position and the closed position. A lever mechanism frequently is provided in an operative connection between the slat and the drive device to transmit the drive forces for adjusting the slats.

A disadvantage of the known devices is that a high degree of accuracy and therefore a high outlay is required to install the individual moving components with orientations that are as exactly as possible with respect to one another. In particular, the production of the operative connection between the output shaft of a drive motor or other drive device, and the drive lever of the lever mechanism is highly sensitive to the relative positioning of the components. A slight erroneous positioning can thus lead to an axial offset or angular positioning of said components with respect to each other. This has the effect that at least part of the drive force is supported on the drive device, on the lever mechanism and/or on a corresponding main body of the air-governing device in the form of a torque or a deflecting force. This can lead to a defect or to an impairment that reduces the permanent stability of the overall system of the air-governing device. Increased friction and therefore increased wear can result.

It is an object of the invention to eliminate or reduce the above-described disadvantages. In particular, it is the object of the invention to improve the installation in a cost-effective and simple manner and to increase the use reliability.

Features and details of the invention emerge from the following description, drawings and claims. Of course, features and details that are described in conjunction with the air-governing device of the invention also apply in conjunction with the installation method of the invention and vice versa in each case. Therefore, reference herein always is made reciprocally to the individual aspects of the invention.

SUMMARY

An air-governing device according to the invention is configured to govern an air flow into a vehicle. For this purpose, the air-governing device has a main body with at least one installation section for fastening to a body of the vehicle and an air opening. At least one slat is mounted on the main body so as to be movable between a closed position that closes the air opening and an open position that opens the air opening. A drive device is fastened to the main body for generating a moving force for the at least one slat. Moreover, a lever mechanism forms an operative connection between the drive device and the at least one slat. The lever mechanism has at least one drive lever that is connected operatively in a torque-transmitting manner to the drive device. Furthermore, the drive lever is fastened in an end position of a keyhole opening in the main body.

The air-governing device of the invention governs an air flow that enters the vehicle from the outside. Governing, within the context of the invention, means both regulating and controlling. Such an air flow can be moved, for example, within the vehicle along corresponding cooling surfaces of a cooling device for the internal combustion engine to govern the cooling capacity of the vehicle or for the vehicle.

The main body can be formed, for example, from plastic and can be manufactured as an injection molded component. The main body is fastenable to the body of the vehicle via an installation section that may use screws, rivets, adhesive joints, welded joints and snap-latch connections.

The at least one slat is used to open or close the air opening to regulate the air flow through the air-governing device. Plural slats may be provided and over their entire extent have a cross section similar to the free cross section of the air opening. Therefore the slats can close the air opening together, possibly with a small overlap. The slats may be mounted rotationally, and therefore the slats can carry out a pivoting or rotational movement between the closed and open positions. The slats may be connected operatively to one another via the lever mechanism so that they can carry out a joint movement in a parallel manner. All of the slats, therefore, always are in the same position, i.e. all closed, all open or all in identical intermediate positions.

The drive device may be motorized to provide a motorized drive force. The lever mechanism transmits the drive force from the drive device to the respective slat. One end of the lever mechanism is an input that receives the drive force from an output shaft of the drive device. The other end of the lever mechanism transmits force to the individual slats directly or in the form of a combination of forces and torques or exclusively in the form of torques.

The main body has a keyhole opening. A keyhole opening should be understood within the context of the invention as meaning an aperture or a hole that has different free cross sections. The different cross sections of the keyhole opening may include a wide hole opening section and a narrow hole opening section. The wide opening section may guide the drive lever to obtain its defined positioning in the axial direction. The drive lever then may be displaced laterally or parallel to the keyhole opening and may be displaced into the second section of the keyhole opening having a reduced, free cross section. Axial securing of the drive device by the geometrical correlation with the reduced, free cross section of the keyhole opening takes place in this position. The end position is defined by the drive lever correspondingly striking on the edge of the keyhole opening in the second section in the end position.

The installation is made significantly easier by the correlation of a corresponding keyhole opening and of the drive lever. A defined and simple installation option based on the simple installation steps of guiding through and displacing laterally is provided by correspondingly precise manufacturing of the keyhole opening. The complexity of the production is significantly reduced by these simple installation steps. At the same time, however, an exact axial or angular orientation of the drive lever relative to the main body is possible by specifying a defined end position with the aid of the keyhole opening. The main body also may have a fastening intersection for the drive device. Thus, a reduced tolerance threshold and an increased positioning accuracy for the relative position between drive lever and drive device can be obtained by the main body as reference component. The increased positioning accuracy is associated with reduced complexity of installation, and therefore the advantages described can be achieved.

The reduction in the installation complexity and the improved orientation of the individual components with respect to one another avoids undesirable force flows during operation of the air-governing device. In particular, improved concentricity of the drive lever and the drive device avoids a supporting torque and an associated increased friction. The main body has all of the intersections for the components to be positioned to ensure the required fitting accuracy in respect of the defined relative positioning. The main body can be produced, for example, by a plastics injection molding process, and therefore the main body can achieve the reference accuracy with the reducing tolerance dimensions in a cost-effective and simple manner. Of course, however, such a keyhole opening can also be produced by machining.

The lever mechanism may comprise a connecting lever between the drive lever and the at least one slat. The connecting lever may be mounted rotatably on the main body with an axis of rotation parallel to the axis of rotation of the drive lever. The axis of rotation of the drive lever may be offset laterally in parallel with respect to the axis of rotation of the connecting lever. The connecting lever may have an axis of rotation for each slat, and therefore, if there are two or more slats, two or more parallel axes of rotation may be provided. One connecting lever can have a plurality of components in addition to the transmission to provide a corresponding division of the drive forces to be transmitted to the individual slats. Furthermore, the lever mechanism can have a central web that provides additional stabilization if the individual slats have a long axial extent. The central web can be fastened simultaneously to a plurality of slats to avoid sagging and to provide a defined distance even in the case of axially long slats. The central web also may have a rotatory mounting for the slats and, accordingly, also may be fastened to the main body. The connecting lever provides the intake of the drive force from the drive lever and distributes the drive force and transmits the drive force to the slats.

The main body may have at least one fastening rib in the region of the keyhole opening, and particularly on the edge of the keyhole opening, for the fastening the drive lever. Thus, the fastening can take place automatically by a snap-latch connection. For this purpose, the fastening rib can be elastic. In the case of the two installation steps already explained, the displacement of the drive lever into the end position may be carried out in the second step. The fastening rib can yield elastically to the movement and therefore to the component of the drive lever and, in the end position, can latch back into the elastic basic position thereof. The drive lever therefore is fastened simply and automatically in a defined end position. At the same time, the fastening rib and a corresponding latching-back action provide a haptic and visual or even acoustic message that the drive lever is now in the end position for said installation step. This increases the installation reliability while simultaneously reducing the complexity of the installation step. Furthermore, the tolerance accuracy on the main body is reduced since only the fastening rib now provides the defined stop position as end position for the drive lever. The edge of the keyhole opening should be understood here as meaning the encircling edge contour of the keyhole opening or of the adjacent region. In particular, the fastening rib extends substantially perpendicularly to the pass-through direction of the keyhole opening.

The drive lever may have a radial extent that extends, at least in sections, beyond the edge of the keyhole opening on both sides of the keyhole opening. Thus, the drive lever that has been displaced into the end position is prevented geometrically from being displaced axially out of the keyhole opening. In other words, the drive lever is now clamped axially in the end position by its geometrical extent and the correlation of the edge of the keyhole opening. This secure axial fastening achieves a more compact construction of the overall system of the air-governing device and also improves the security against undesirable release of the operative connection with the drive device. In particular, the axial securing is provided with a radial extent completely around the edge of the keyhole opening or around the edge of the drive lever.

The drive lever may have a bearing component that is fastened to the main body, and may further have a lever component that is mounted on the bearing component for rotation about a rotation axis. Of course, the two components can be formed as a single piece, integrally and/or monolithically with each other. The axis of rotation may be identical to the rotation axis of an output shaft of the drive device. The separation of these two functionalities, i.e. the intake of the drive force, on the one hand, and the lever movement, on the other hand, leads to a reduced complexity of the drive lever. In particular, the output shaft of the drive device is oriented coaxially with the rotation axis of the drive lever. The drive lever can be made of plastic, and may be an injection molded component.

The main body may have at least one reinforcing section for increasing the torsional rigidity of the main body in the region of the keyhole opening. For example, material reinforcements and/or ribs can be provided to increase the torsional rigidity of the main body in the region of the keyhole opening. Separate structural components that are brought into a corresponding force-transmitting fastening with the main body can also provide this function. This embodiment advantageously reduces the distortion of the main body in the region of the keyhole opening and in the region of the fastening of the drive lever. Undesirable distortions that could lead to an offset in concentricity or an angular offset of the drive lever with respect to the drive device also are reduced. Accordingly, the mechanical load of the output shaft, of the main body and of the drive lever are reduced, thereby improving overall component stability.

The main body may have at least one sliding section downstream of the at least one slat in the air flow direction. The sliding section may have a sharp-cornered and/or rounded design with respect to body components of the vehicle that are downstream in the air flow direction. The sliding section is intended for the crash situation of the vehicle. More particularly, an air-governing device that is at the front or rear end of a vehicle is moved out of the use position to the center of the vehicle in the event of a collision. During this movement, the sliding section enables the air-governing device to slide on corresponding downstream body components of the vehicle. Accordingly, damage to the air-governing device and to the body components is reduced or completely avoided. In particular, damage to the air-governing device can be avoided entirely in the case of minor parking bumps, and therefore the resulting repair costs can be reduced significantly.

The at least one slat may have at least one supporting tab for supporting a rotatable fastening to the main body and/or to a central web for stabilizing the at least one slat. In particular, the supporting tab may be flexible or elastic to permit a clipped or latching installation. Depending on the use situation, high force loads by a corresponding air flow may act on the individual slats. The supporting tab avoids an undesirable decoupling of the rotation mounting on the main body or on the central web and reduces complexity. A lateral slipping out of the corresponding rotation mounting is therefore avoided efficiently, cost-effectively and above all simply.

The at least one slat may have a carrier and a covering that the covers the surface of the carrier component that is directed outward with respect to the vehicle when the at least one slat is in the closed position. This leads to a significant cost reduction since the mechanical stability can be provided substantially exclusively by the carrier. Use can be made of a cost-effective material, for example a simple plastic. The covering can visually cover the carrier from the outside, thereby making the carrier invisible and achieving a positive visual and quality effect. The covering can be secured to the carrier by adhesive bonding, welding, clipping or fastening in another manner or by two-component injection molding. The covering has a "1st class" surface, for example a chromium-plated or a pitted surface. The covering accordingly is thinner and lighter since it has only slight inherent mechanical stability, if any at all.

The invention also relates to an installation method for installing an air-governing device. The method includes introducing a drive lever of a lever mechanism into a keyhole opening in a main body, displacing the drive lever into a defined end position, and fastening the drive lever in the defined end position. The method further includes fastening a drive device to the main body in operative connection in a torque-transmitting manner with the drive lever, and fastening at least one slat in a rotatably mounted manner to the main body in operative connection with the lever mechanism.

The installation method of the invention affords the advantages explained above with respect to the air-governing device. Of course, the slats can be fastened at different times. The installation also can take place before the drive lever is introduced into the keyhole opening so that the operative connection is produced at the end.

Further advantages, features and details of the invention emerge from the description below in which exemplary embodiments of the invention are described in detail with reference to the drawings. The features mentioned in the claims and in the description may in each case be used individually by themselves or in any combination.

DETAILED DESCRIPTION

Figure 1:
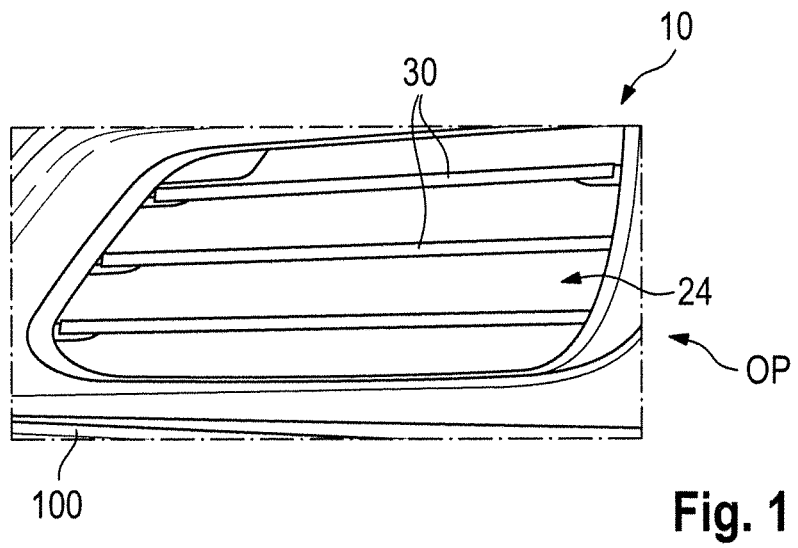
FIG. 1 is a front view of an air-governing device in an open position.
Figure 2:
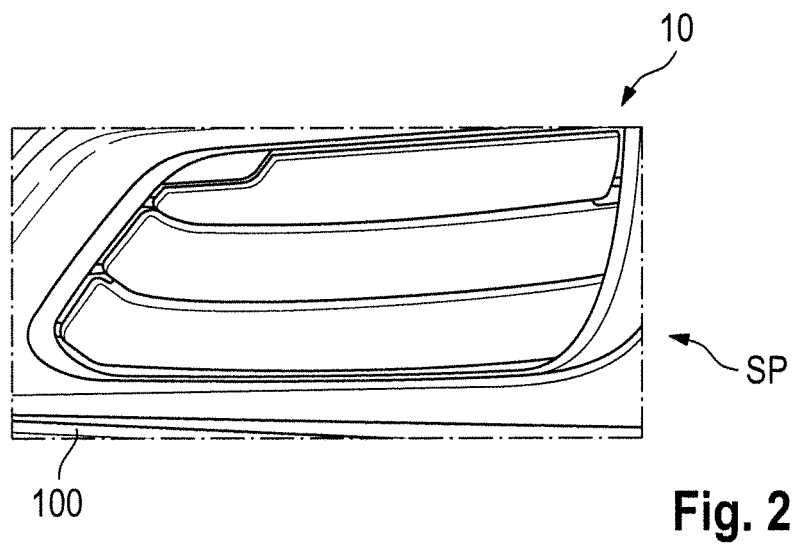
FIG. 2 shows the embodiment of FIG. 1 with the slats in a closed position.
Figure 3:
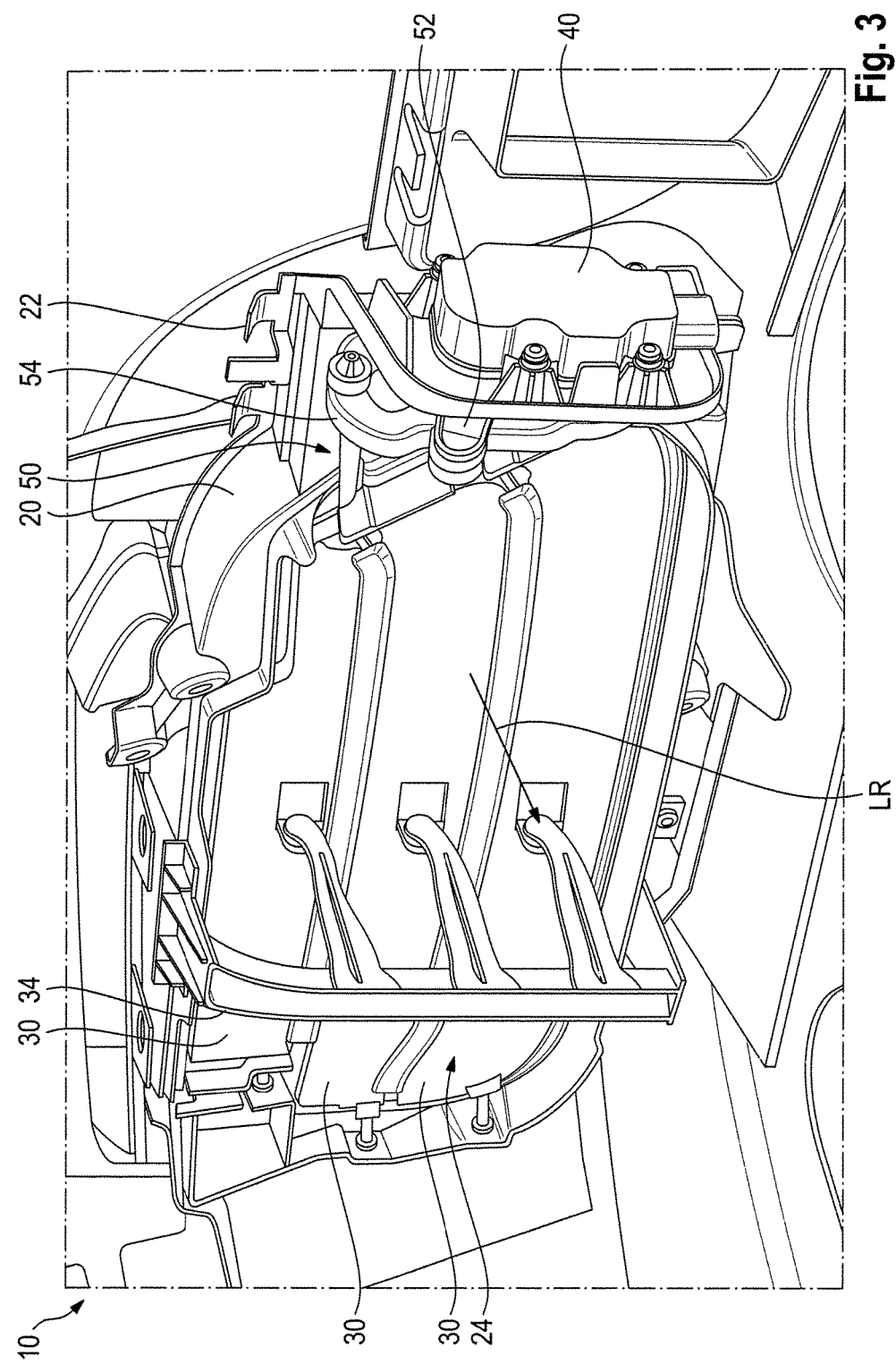
FIG. 3 is a rear view of the embodiment of FIGS. 1 and 2.

An air-governing device 10 in accordance with the invention is arranged on a vehicle 100, as shown in FIGS. 1-3. The air-governing device 10 has a main body 20 with an air opening 24, as shown in FIG. 3. The main body 20 functions to fasten the entire module of the air-guiding device 10 to the body of the vehicle 100. For this purpose, installation sections 22 permit a defined positioning and/or fastening of the air-guiding device 10 to the vehicle 100. FIG. 1 shows three slats 30 of the air-guiding device 10 in an open position OP for the admission of air LR, while FIG. 2 shows the slats 30 in the closed position SP. The air-governing device 10 can function, for example, to supply cooling air LR to a cooling device.

The air-governing device 10 has a central web 34 that is fastened to the main body 20, as shown in FIG. 3. The central web 34 provides bearing positions in the center for the slats 30 to permit greater stability for positioning of the slats 30. An electromotive drive device 40 is fastened at the right end to the main body 20. A lever mechanism 50 is provided on the rear of the main body 20 and is assigned to the slats 30. The lever mechanism 50 includes a drive lever 52 and a connecting lever 54, which are explained in more detail below with reference to FIG. 4.

Figure 4:
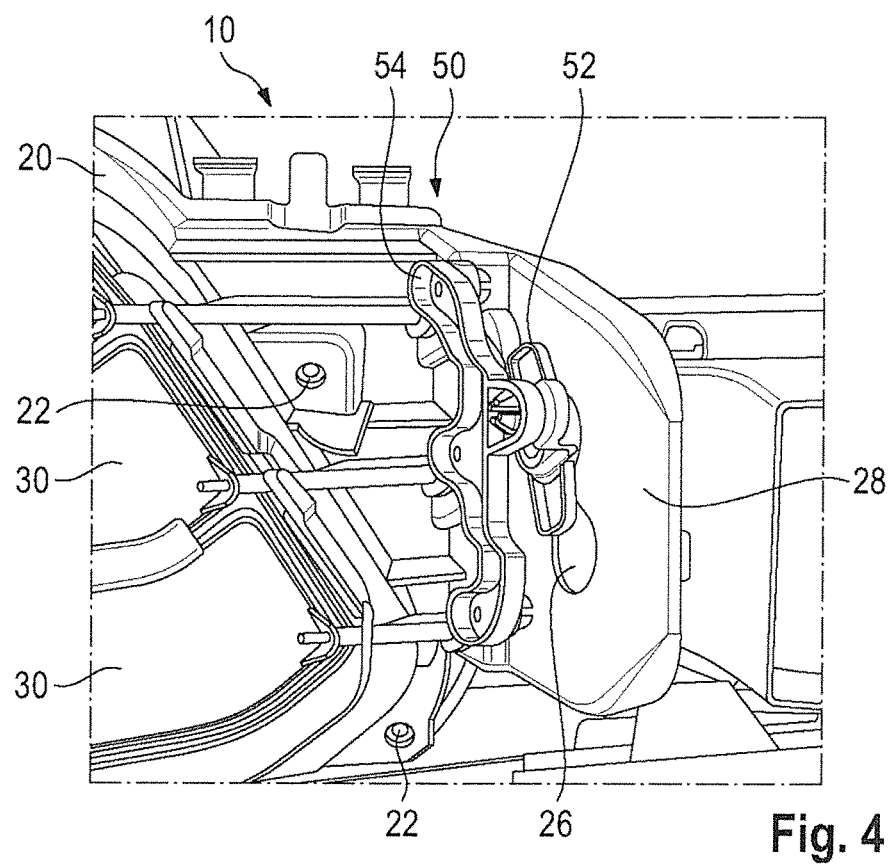
FIG. 4 is a perspective view of the air-governing device and the lever mechanism thereof.
Figure 6:
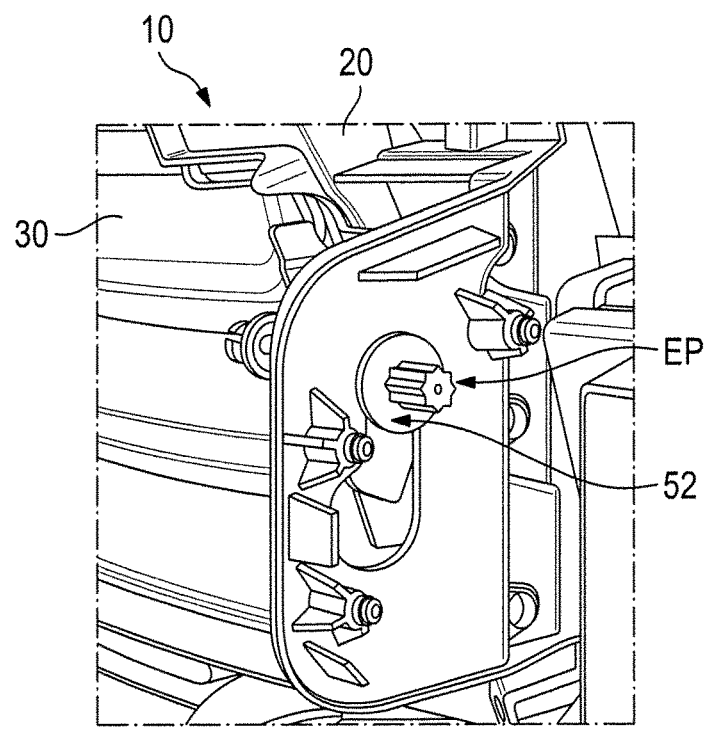
FIG. 6 is a rear view of the air-governing device of FIG. 5.
Figure 7:
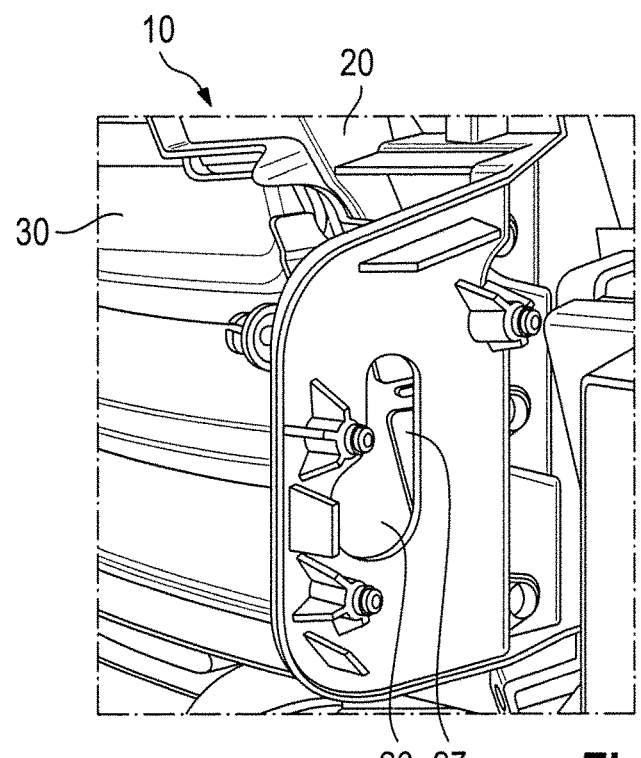
FIG. 7 illustrates the keyhole opening without the drive lever.

The main body 20 has a keyhole opening 26, as shown in FIG. 4. A drive lever 52 initially is inserted into the wide lower section of the keyhole opening 26 shown in FIG. 7, and then is displaced up to an end position EP, as shown in FIG. 6, to complete the two main installation steps during assembly of the air-governing device 10. During this upward displacement, a fastening rib 27 of the main body 20 is displaced in an elastically deforming manner and latches as the drive lever 52 reaches the end position EP.

As can be gathered from FIG. 4, the connecting lever 54 has an intersection for receiving the drive force from the drive lever 52. The drive force subsequently is divided between the three slats 30 on corresponding parallel axes of rotation of the slats 30.

Figure 5:
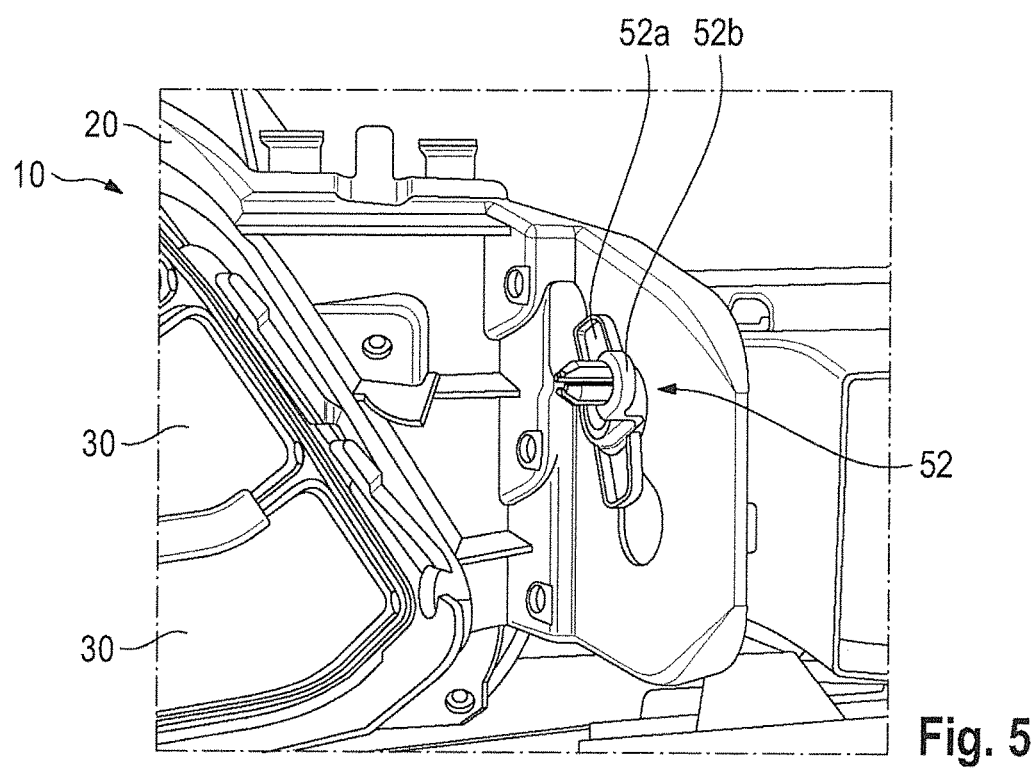
FIG. 5 shows the air-governing device of FIGS. 1 to 4 without the connecting lever.
Figure 8:
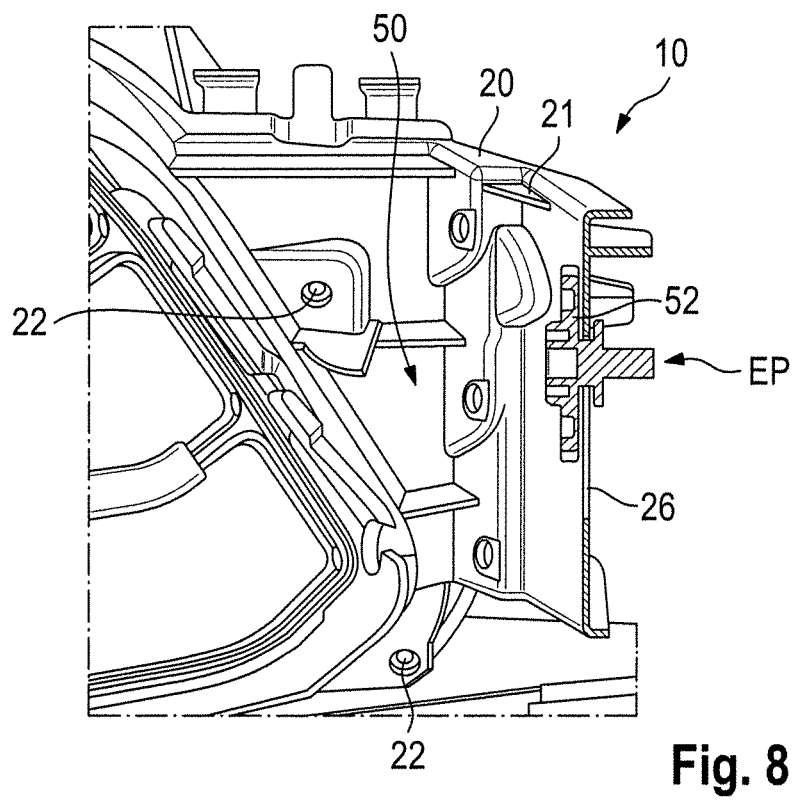
FIG. 8 is a lateral section through the drive lever in the end position.

The drive lever 52 has a bearing component 52a and a lever component 52b that is located in the end position EP of the keyhole opening 26, as shown in FIGS. 5 and 6. The drive lever 52 protrudes radially laterally over the edge of the keyhole opening 26 on both sides of the keyhole opening 26, as shown in FIG. 8, to define the end position EP both axially and radially.

Figure 9:
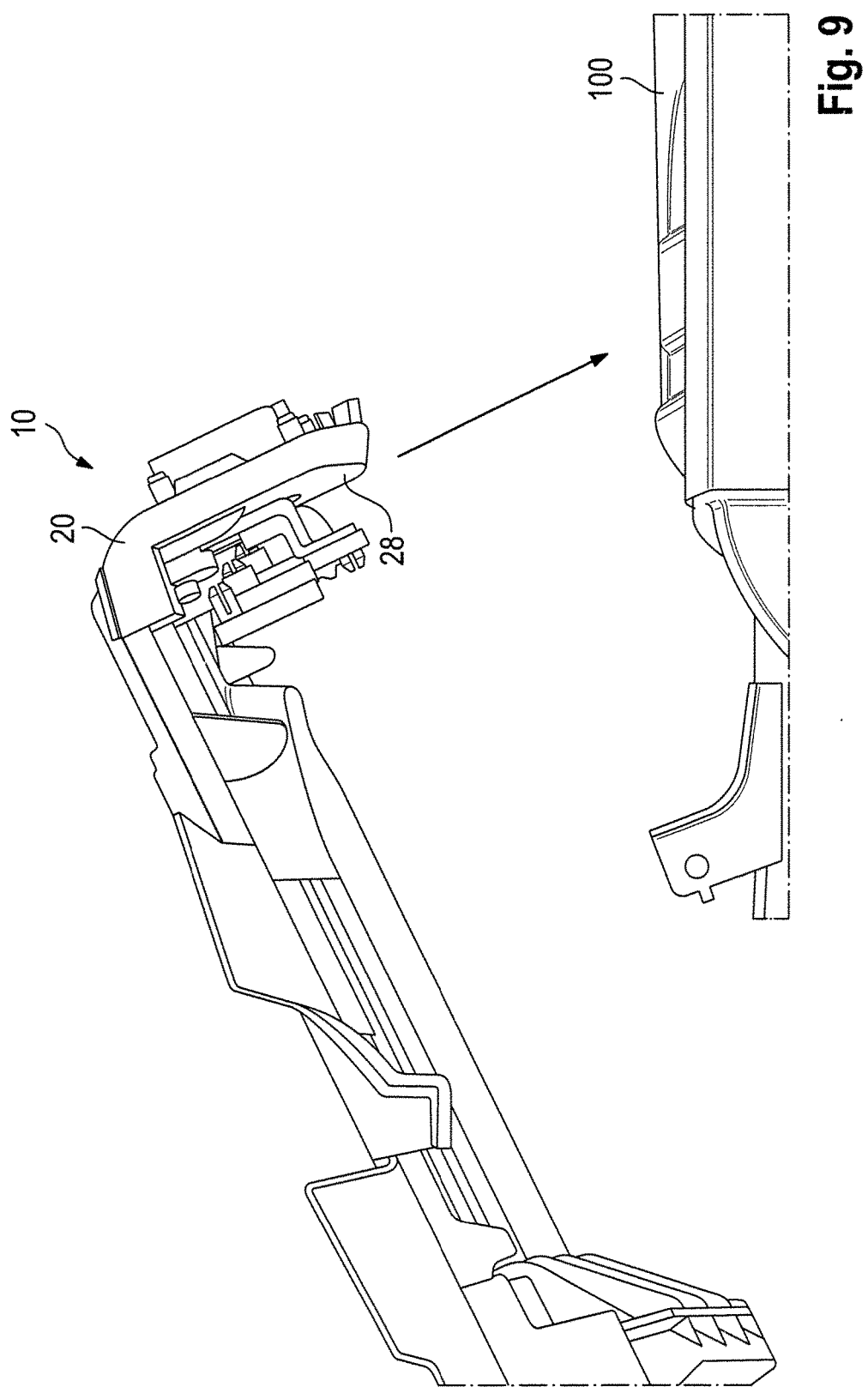
FIG. 9 is an exploded perspective view of a sliding section of the air-governing device.

The air-governing device 10 can move with respect to the body of the vehicle 100 in the event of a crash from the front or rear, as illustrated in FIG. 9. The relative movement is illustrated with the large arrow and leads to the sliding section 28 striking against the body of the vehicle 100. The sliding section 28 has a sharp-cornered or rounded shape that will slide on the component of the body of the vehicle 100 thereby reducing damage to a minimum.

Figure 10:
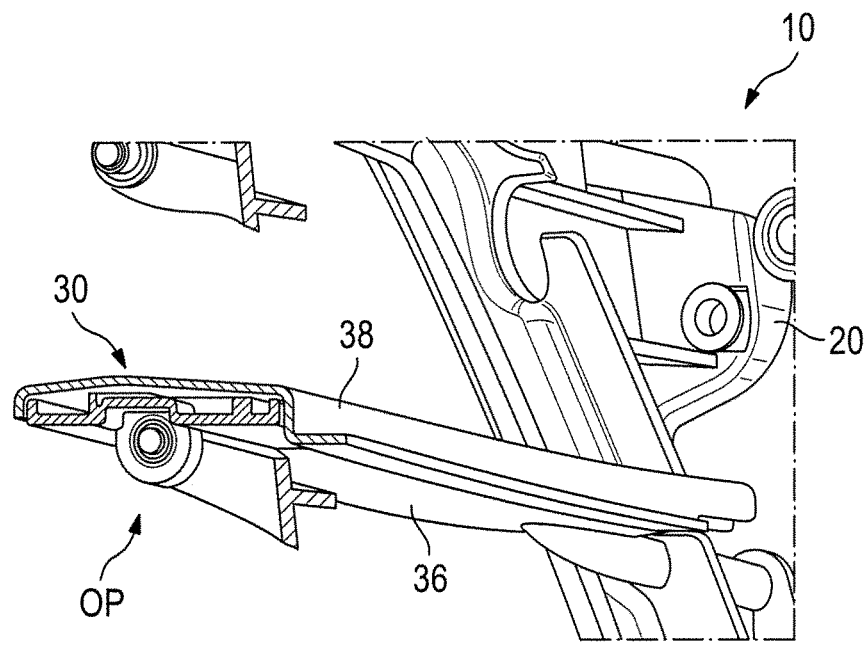
FIG. 10 is a lateral section through a two-part slat.

FIG. 10 is a lateral cross section that illustrates how a slat 30 can be constructed from a carrier component 36 and a covering component 38. The carrier component 36 is produced from a mechanically stable plastic and functions as a mechanical reinforcing structure. The covering component 38 is thin and is applied to the carrier component 36. Hence, the covering component 38 has little inherent mechanical stability and serves for creating a visually attractive surface.

Figure 11:
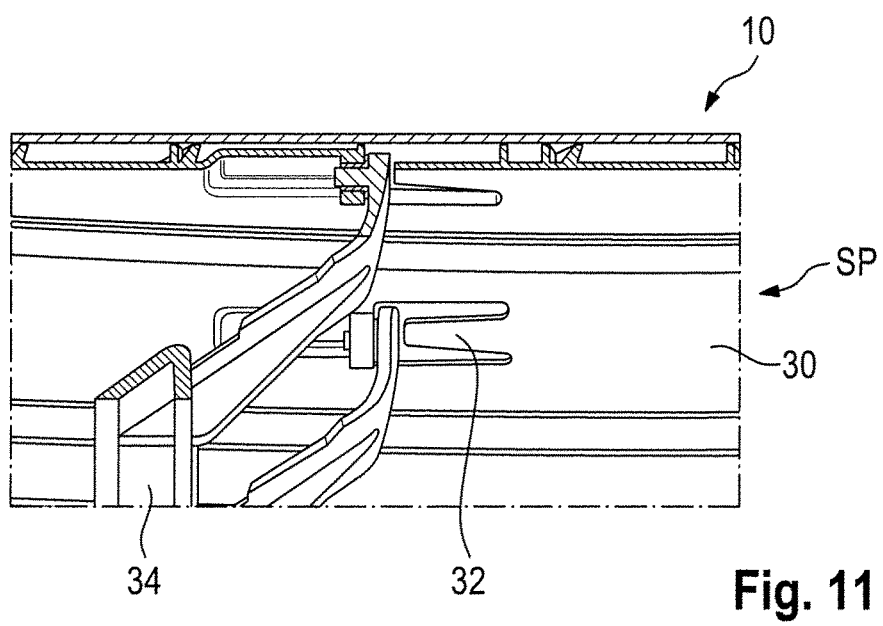
FIG. 11 is a cross section through of a supporting tab.

FIG. 11 shows a possibility of positioning of the slats 30 with the aid of a supporting tab 32 that is elastic or flexible. Thus, the supporting tab 32 can deform elastically when the corresponding rotation mounting is fit and can subsequently latch in. In the latched-in position according to FIG. 11, the supporting tab 32 prevents sliding out of the corresponding rotation mounting on the central web 34 in FIG. 11.

The above explanation of the embodiments describes the present invention exclusively within the scope of examples. Of course, individual features of the embodiments can be freely combined with one another, if technically expedient, without departing from the scope of the present invention.

What is claimed is:

1. An air-governing device for governing an air flow into a vehicle, comprising: a main body with at least one installation section for fastening the main body to a body of the vehicle; an air opening formed through the main body, at least one slat mounted on the main body and being movable between a closed position where the at least one slat closes the air opening and an open position where the at least one slat opens the air opening; a drive device fastened to the main body for generating a moving force for the at least one slat; and a lever mechanism forming an operative connection between the drive device and the at least one slat, the lever mechanism having at least one drive lever that is operatively connected in a torque-transmitting manner to the drive device and is fastened in an end position of a keyhole opening in the main body.

2. The air-governing device of claim 1, wherein the lever mechanism has a connecting lever between the drive lever and the at least one slat, the connecting lever being mounted rotatably on the main body with an axis of rotation parallel to an axis of rotation of the drive lever.

3. The air-governing device of claim 1, wherein the main body has at least one fastening rib at an edge region of the keyhole opening for fastening the drive lever.

4. The air-governing device of claim 1, wherein the drive lever has a radial extent that extends at least in sections beyond an edge of the keyhole opening on two opposed sides of the keyhole opening.

5. The air-governing device of claim 1, wherein the drive lever has a bearing component fastened to the main body and a lever component mounted on the bearing component for rotation about a rotation axis.

6. The air-governing device of claim 1, wherein the main body has at least one reinforcing section for increasing torsional rigidity of the main body in proximity to the keyhole opening.

7. The air-governing device of claim 1, wherein the main body has at least one sliding section downstream of the at least one slat in an air flow direction, the at least one sliding section having a sharp-cornered and/or rounded design with respect to body components of the vehicle that are downstream in the air flow direction.

8. The air-governing device of claim 1, wherein the at least one slat has at least one supporting tab for supporting a rotatable fastening to the main body and to a central web for stabilizing the at least one slat.

9. The air-governing device of claim 1, wherein the at least one slat is constructed from a carrier and a cover, the cover covering a surface of the carrier that is directed outward with respect to the vehicle when the at least one slat is in the closed position.

* * * * *